Sept. 30, 1969 L. DIOLOT 3,469,484
FLYING CUTTER WITH CAMWAY CONTROLLED ACTUATING MEANS
Filed Feb. 3, 1967
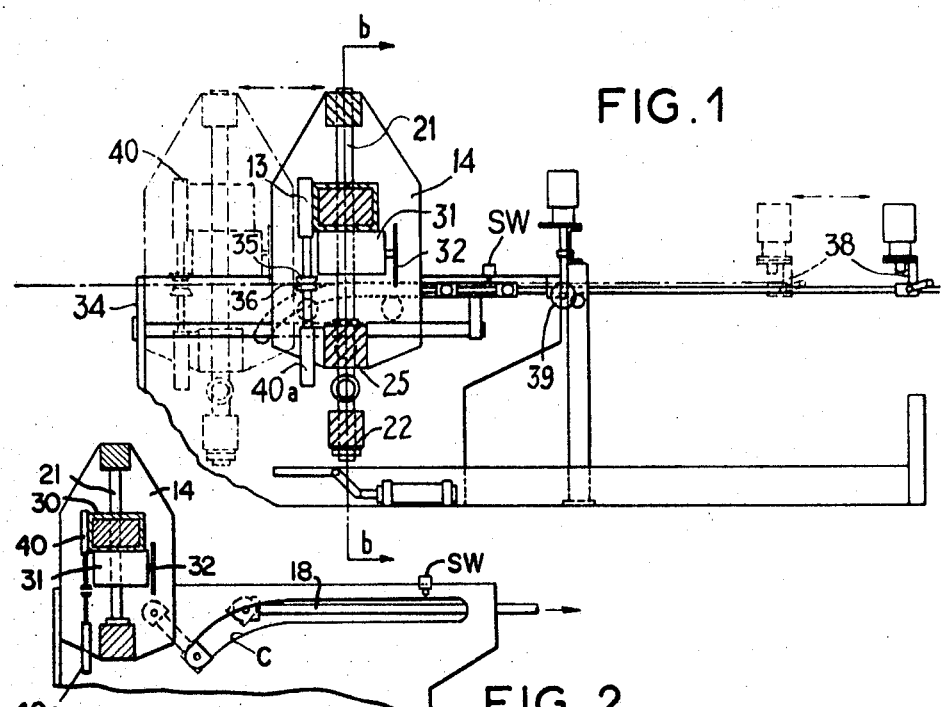
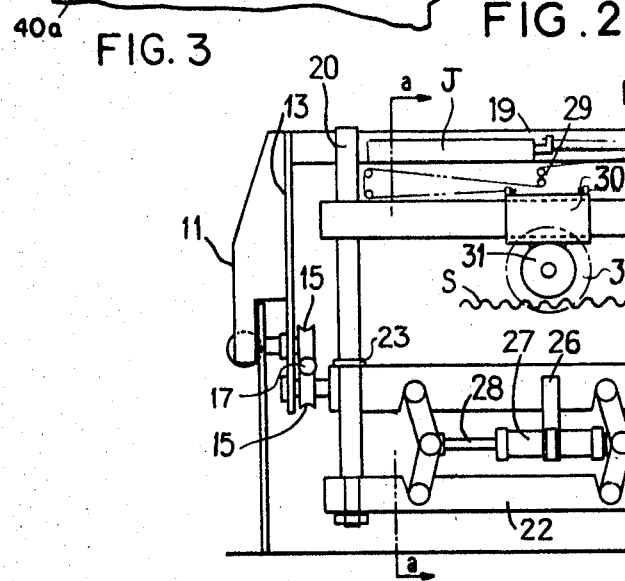
INVENTOR
LUCIEN DIOLOT
BY *Edwin E. Greigg*
ATTORNEY

United States Patent Office 3,469,484
Patented Sept. 30, 1969

3,469,484
FLYING CUTTER WITH CAMWAY CONTROLLED ACTUATING MEANS
Lucien Diolot, Neuilly-sur-Seine, France, assignor to Societe Nouvelle Spidem, Paris, France
Filed Feb. 3, 1967, Ser. No. 613,915
Claims priority, application France, Feb. 7, 1966, 48,684
Int. Cl. B26d 1/56; B23d 25/16
U.S. Cl. 83—294                6 Claims

ABSTRACT OF THE DISCLOSURE

An apparatus for cutting lengths from advancing sheet material by a transversely movable rotary disc supported on a longitudinally movable carriage. The advancing sheet material carries with it the carriage and after a predetermined period the rotary disc is caused to move transversely to cut a sheet of material to length.

---

This invention relates to an automatic cutting device for corrugated or profiled sheets which travel continuously longitudinally of a supporting frame or carriage and is further characterized by the fact that the cutting tool is supported by a movable carriage, the movement of which is produced by advancement of the sheet by way of a progressive starting system. The starting system for the cutter is produced by a double linkage, the two central points of articulation of which are compelled to move through roller means associated with cam means, the profile of which is calculated so that the movement of the sheet imparts to the carriage supporting the cutting tool a uniformly accelerated movement, thus bringing it up to a speed equal to that of travel of the sheet, all of which is accomplished without stopping the shaping machine or the travel of the sheet.

In my earlier Patent No. 3,211,037, issued Oct. 12, 1965, and assigned to Societe Nouvelle Spidem, I have disclosed such a machine in which cutting is effected by a shearing operation. In that patent I have shown and described a machine which includes a base portion comprising uptsanding means adapted to support diametrically and horizontally opposed support means. This organization of elements is adapted to suport a frame means which is arranged to reciprocate relative to the support means. The frame means includes oppositely disposed blades which shear in a vertical direction and that are arranged to cooperate with each other through horizontally disposed reciprocable rod means together with a linkage means and are therethrough caused to move to and fro through cooperative hydraulic or penumatic presure means as a sheet is advanced into the machine between the blades and to be severed to length.

All of the advantages which are inherent from the use of the construction shown in my earlier patent are also applied hereto and the improvements shown and described herein are more particularly concerned with the movable carriage and the rotary type cutting device which may comprise saw-toothed discs as well as other abrasive type rotating devices capable of rapidly severing a strip of metal as it advances through the machine.

Furthermore, the machine also has the additional advantage of being able to start from heavy coils which advance thereto directly from the rolling mill, and, accordingly, is capable of using the shaping machine in an absolutely continuous manner during the unwinding of one coil, whereas the sheet-by-sheet method requires unstacking and necessarily involves an idle period, however small, between the finishing of one sheet and the introduction of the next.

Furthermore, it will be appreciated as the description progresses that, whereas in my earlier patent pressure-operated means are adapted to raise the lower cutting blade in a vertical direction to sever the advancing sheet, the pressure operated means in this instance raises and lowers the rotary cutting means as it is being reciprocated transversely of the sheet to thereby sever a portion therefrom.

Other objects and advantages will become apparent from the following description taken in conjunction with the accompanying drawings, in which:

FIG. 1 is a side elevational and cross-sectional view of my improved machine showing in full lines the position of the sheet during severing and in dotted outline the position of the cutting carriage immediately prior to entry of a sheet, FIG. 2 is a view on line a—a of FIG. 1 through a portion of the cutting carriage, and FIG. 3 shows the carriage in its forward position before a sheet is introduced.

Turning now to the drawings of the new improved machine, there is shown in FIG. 1 a view that generally approximates FIG. 3 in my earlier patent. However, to facilitate an understanding of the operation of the machine, reference is made initially to FIG. 2. A yoke-like member, generally indicated as 10, is provided at each end portion with a pair of spaced outer dependent legs 11 and 12 which are associated with the system of cranks (FIG. 3) for executing movements of the plate members 13 and 14 which are suitably provided with spaced pairs of rollers 15—15 and 16—16, respectively, with each of the pairs of rollers being arranged to straddle longitudinally extending rod means 17 and 18, respectively. As thus far described, the elements referred to are all similar to those shown in my earlier patent.

The yoke 10 includes a horizontally disposed transversely extending bar means 19 which is appropriately apertured (see FIG. 1) and thereby adapted to receive the vertically extending, spacedly arranged posts 20 and 21 which are adapted to be together with the elements now to be described simultaneously raised and lowered, as desired, to effect the cutting operation.

The vertically extending posts 20 and 21 are securely fastened at each of their lower end portions by any suitable means to a secondary horizontally disposed bar means 22.

In spaced relation to the bar means 22 and positioned thereabove in contact with spaced abutments 23 and 24 is a carriage bar 25, the offstanding end portions of which are adapted to support one each of the previously described rollers 15—15 and 16—16, respectively.

Substantially medially of bar 25 there is arranged a dependent support means 26 to which is attached in any preferred manner a dual hydraulic or penumatic cylinder 27. The pressure operated cylinder means 27 thereof is provided with rod means 28 to the opposite ends of which are pivotally secured linkage means of the same type as that shown in my earlier patent which, however, function in a different manner as will now be described.

As described in my earlier patent and as previously mentioned herein, the pressure operated means referred to immediately above raises and lowers the lower cutting blade to accomplish the severing operation. However, in the present construction when pressure is introduced into the cylinder 27 to extend the linkage and raise bar 25, because of stop means 23 and 24 one each being carried by vertical posts 20 and 21, the posts will be simultaneously raised or lowered and, in turn, raise and lower the transversely extending support means 29 for the rotary motor 31 together with its cutting means 32.

The support means 29 is rigidly secured to the upstanding posts 20 and 21 and may have a cross-sectional configuration of any desired shape, that is, square, rectangular, tubular, etc. A sleeve 30 is slidably arranged on the support bar 29 and provided with a depending means of any suitable type to which the rotary motor 31 and its cutting means, may be secured.

A relatively simplified system for traversing the electric motor and its rotary saw relative to the sheet for the cutting operation is depicted schematically also in FIG. 2. To the transverse bar means 19 is attached a jack means "J" which includes a piston rod "P" and to the free end of this rod are secured several pulleys. To one side of the slidable support for the motor 31 is secured one end of a cable which passes first over the fixed pulleys shown and then travels over one of the pulleys "P'" carried by the piston rod and has its free end secured to the jack means "J." To the opposite side of the motor support sleeve 30 is fastened another cable which is passed about still other fixed pulleys and then about the second pulley P2 carried by the piston rod and dead ends on the frame 21. It is believed that it will be apparent to those skilled in the art how the switch SW can readily be utilized to actuate means to impulse the jack means and thereby move the motor and saw relative to the sheet to be cut.

It will be apparent to those skilled in the art that the rotary motor 31 may be associated with its supporting sleeve in any manner desired.

Although in my earlier patent there is shown a number of different views of the device, for clarity it is believed the operation of the present machine will be understood from the two views in the drawing and from the following description of operation.

OPERATION

Assuming that the yoke 10 with its associated elements is in substantially abutting relation with the wall 34, as shown in dotted outline, the clamping means 35 and 36 actuated by suitable jacks 40 and 40a, respectively, are in a separated condition so that they do not engage the advancing sheet as it passes through the yoke 10 and into contact with the stop means 38. When the advancing sheet first engages the stop means 38 it is then in its dotted outline position shown in FIG. 1.

As soon as contact of the sheet with the stop means 38 is attained, the clamping means 35—35 and 36—36, respectively (one pair shown), grasp the sheet and the entire cutting carriage and frame is moved forward, whereupon the yoke element and the stop means 38 finally attain the position shown in full lines in FIG. 1. As the carriage and its associated linkage elements attain the position shown in full lines in FIG. 1, a switch means "SW" secured adjacent to camway "C" is contacted by a portion of the linkage means thereby initiating the sequence of events which takes place successively to bring about the cutting operation. Substantially simultaneously with this condition being attained, the pressure operated means 27 is deactivated, whereupon the linkage means is shortened and the motor 31, which has been at rest adjacent to either one or the other of the posts 20 or 21, is activated and caused to move across the sheet severing the same. Although it is indicated that the motor 31 may begin its cutting operation conceivably on the one hand from left to right of the advancing sheet or on the other hand from right to left thereof it is preferred, and considered to be a simpler procedure, that after each severing operation the carriage 6 returns to a position adjacent to post 21. As explained in my earlier patent the rollers 39 (one shown) are lowered so the sheet may be disposed on the stacking mechanism best shown in FIG. 1.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:

1. In a device adapted for continuously severing horizontally traveling sheets of predetermined length from advancing stock, the combination comprising spacedly arranged upstanding means adapted to support diametrically and horizontally opposed support means, a frame means including a yoke arranged for reciprocable movement on said support means, rotary cutting means associated with said yoke, means adapted to actuate said rotary cutting means, means arranged for moving the rotary cutting means transversely of the frame means, parallel spacedly arranged horizontally disposed reciprocable rod means carried by said upstanding means, linkage means associating said frame means with said reciprocable rod means, means carried by said last named means adapted to be driven by the advancing stock for imparting movement to said linkage means, camway means for controlling the path of travel of said linkage means to cause said rotary cutting means to advance with progressive speed in the direction of travel of said sheet and means adapted to energize said actuating means of said cutting means to reciprocate the same to sever a length of said sheet from the moving stock when the speeds of travel of said cutting means and said sheet are substantially equal.

2. In a device adapted for continuously severing horizontally traveling sheets according to claim 1, wherein pressure operated means associated with the frame means is adapted to reciprocate the rotary cutting means in a plane normal to the direction of the advancing stock.

3. In a device adapted for continuously severing horizontally traveling sheets according to claim 1, wherein the rotary cutting means is associated with said yoke means by a transversely extending bar means, said bar means being secured to spacedly arranged post means which are adapted to reciprocate relative to the yoke.

4. In a device adapted for continuously severing horizontally traveling sheets according to claim 3, wherein the rotary cutting means is slidably supported on said transversely extending bar means.

5. In a device adapted for continuously severing horizontally traveling sheets according to claim 1, wherein the frame means is provided with clamping means adapted to engage the stock while it is being severed.

6. In a device adapted for continuously severing horizontally traveling sheets according to claim 5, wherein the clamping means include diametrically disposed paired means arranged to grip the advancing stock adjacent to the longitudinally extending edges thereof.

References Cited

UNITED STATES PATENTS 1,844,837   2/1932   Braum _____ 83—294 X
3,190,162   6/1965   Sonneland _____ 83—319 X JAMES M. MEISTER, Primary Examiner U.S. Cl. X.R.

83—320